UNITED STATES PATENT OFFICE.

HENRY S. CROOKE, OF NEW YORK, N. Y.

ROLLED-FOIL WRAPPER.

SPECIFICATION forming part of Reissued Letters Patent No. 10,202, dated September 19, 1882.

Original No. 229,676, dated July 6, 1880. Application for reissue filed August 8, 1882.

*To all whom it may concern:*

Be it known that I, HENRY SUYDAM CROOKE, of New York, in the county of New York and State of New York, have made an invention of a new article of manufacture of dead-surfaced or whitened rolled-foil wrappers, and of the process of manufacturing the same; and I do hereby declare that the following is a full, clear, and exact description and specification of the same.

Wrappers of metallic foil are used for inclosing many articles which it is desirable should be protected in whole or in part from atmospheric influences. Rolled metallic tin-foil (either of pure tin or of tin combined with lead) is the article generally used for such wrappers, on account of its flexibility; but such wrappers as hitherto produced have had the bright or burnished metallic surfaces which rolled tin-foil possesses when it leaves the rolls employed to manufacture it. Such a bright surface is objectionable, because it does not take printers' ink with facility and because it reflects too much light to the eye and does not afford a good contrast to the printing.

My manufacture is free from the above objections; and it consists of a wrapper or sheet of rolled tin-foil (either pure or alloyed) having a dead or whitened surface at one or at both faces imparted to it by the process hereinafter described. These new wrappers are distinguished from wrappers of paper or cloth by being impervious. They are distinguished from previous articles of rough-surfaced sheet metal by their flexibility, which corresponds substantially with that of paper, and enables them to be used in place of paper wrappers for wrapping up various articles, such as soap, tobacco, and ground spices. These new wrappers also are distinguished from the rolled-foil wrappers hitherto produced by their dead or whitened surface at one or both sides in contrast with the glistening or burnished metallic surfaces hitherto possessed by rolled-foil wrappers.

The process by which I have produced my new manufacture with success is by pressing the tin-foil, as hereinafter described, in contact with paper having a dead surface, whereby the peculiar dead surface of the paper is imparted in whole or in part to the tin-foil. The wrappers may be cut to size before being subjected to the deadening or whitening process, or may be so cut afterward, as deemed expedient; and after the dead or whitened surface is imparted to them they are printed with such figures or letters, or both, as may be required for the purpose for which they are to be used, such printing being effected in the usual manner heretofore practiced for printing tin-foil wrappers, which it is not necessary to describe in detail.

The tin-foil is produced by rolling it out of a cast ingot in the usual manner, which, being well known, need not be described in detail. The rolled foil may then be cut into wrappers of the required size, and the deadening or whitening of the surface may be effected by applying sheets of paper to one or both sides of the tin-foil and by pressing the whole between the calender-rolls, whereby the required pressure is applied. I prefer, however, to subject the rolled tin-foil to the deadening or whitening process while in the long sheet or roll in which it generally exists when finished by the rolling-mill, and to cut the dead or whitened surface foil into wrappers subsequently. In such case the dead or white surfacing may be effected by pressing the sheets of rolled tin-foil between calender-rollers with a sheet of paper at either one or both of its sides, according to whether the wrappers are to be dead or white surfaced at one or at both faces. The paper as it passes from the rolls may be rolled upon a roller provided for the purpose. I prefer, however, to impart the dead or whitened surface to the sheet of foil by passing it between a pair of calender-rolls, the surface of one or both of which is frosted mechanically. The sheet of dead or white surfaced tin-foil passing from the rolls is by preference printed in the sheet, and is cut afterward into wrappers of the required size.

The means used for printing and cutting up the dead or white surfaced tin-foil may be the same as those used for printing and cutting up burnished tin-foil.

In case the foil is to be dead or white surfaced at both sides, this result may, if deemed expedient, be produced by passing the long sheet of foil and one corresponding sheet of paper between a pair of rolls, one of which is smooth-surfaced and the other of which has a frosted surface, the paper being between the foil and the smooth-surfaced roll.

When the dead or white surfaced rolled-foil wrappers are produced in sheets, as above described, they may be sold to the users in that condition, and may be cut by them to the sizes required for the purposes to which they are to be applied.

I am aware that sheet-metal articles such as are made of Britannia metal and silver have had a matted, engraved, or roughened surface imparted to them in various ways; also that sheet metals such as tin plates have been roughened or abraded, and then painted or printed upon. In both these cases, however, the thickness and rigidity of the sheet metal were such as to prevent its use as a wrapper. I therefore do not claim broadly an article or manufacture of sheet metal either rough-surfaced alone or both rough-surfaced and printed; but

I claim as my invention—

1. The improvement in the art of making metallic-foil wrappers, consisting of the following operations, viz: the rolling of the tin-foil out of the ingot and the dead surfacing or whitening of the rolled tin-foil, all substantially as described.

2. As a new article of manufacture, the wrappers of rolled tin-foil having a dead or whitened surface imparted to it, substantially as herein described.

3. As a new article of manufacture, the wrappers of rolled tin-foil having a dead or whitened surface and printed, substantially as herein described.

4. The improvement in the art of making metallic-foil wrappers, consisting of the following operations, viz: the rolling of the tin-foil out of the ingot, the dead surfacing or whitening of the rolled foil, and the subsequent printing of the dead surface, substantially as before set forth.

Witness my hand this 4th day of July, A. D. 1882.

HENRY SUYDAM CROOKE.

Witnesses:

M. B. PHILIPP,

LEWIS CROOKE.

Corrections in Reissue Letters Patent No. 10,202.

It is hereby certified that in Reissue Letters Patent No. 10,202, granted September 19, 1882, to Henry S. Crooke, for an improvement in "Rolled Foil Wrappers," the date of filing the application for Reissue was erroneously given at the head of the printed specification, August 8, 1882, whereas it should have been July 6, 1882, which is the correct date; that the proper corrections have been made in the files and records pertaining to the case in the Patent Office, and are hereby made in said Letters Patent.

Signed, countersigned, and sealed this 21st day of September, A. D. 1882.

[SEAL.]

M. L. JOSLYN,
*Acting Secretary of the Interior.*

Countersigned:

E. M. MARBLE,
*Commissioner of Patents.*